(12) United States Patent
Gupta et al.

(10) Patent No.: US 10,715,630 B2
(45) Date of Patent: Jul. 14, 2020

(54) COMMON INFORMATION MODEL INTEROPERABILITY SYSTEM

(71) Applicant: Dell Products L.P., Round Rock, TX (US)

(72) Inventors: Chitrak Gupta, Bangalore (IN); Chandrasekhar Puthillathe, Bangalore (IN); Kiran Krishnappa, Bangalore (IN); Abhirup Seal, Kolkata (IN); Hari Venkatachalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 16/041,131

(22) Filed: Jul. 20, 2018

(65) Prior Publication Data

US 2020/0028936 A1 Jan. 23, 2020

(51) Int. Cl.
*H04L 29/08* (2006.01)
*H04L 29/06* (2006.01)
*G06F 9/54* (2006.01)

(52) U.S. Cl.
CPC .............. *H04L 67/32* (2013.01); *G06F 9/547* (2013.01); *H04L 67/02* (2013.01); *H04L 67/42* (2013.01)

(58) Field of Classification Search
CPC ......... H04L 67/32; H04L 67/02; H04L 67/42; G06F 9/547
See application file for complete search history.

(56) References Cited

U.S. PATENT DOCUMENTS

| 7,843,906 | B1 * | 11/2010 | Chidambaram | H04L 47/6205 370/386 |
| 8,495,657 | B1 * | 7/2013 | Ramamurthy | H04L 41/0273 719/313 |
| 8,631,064 | B2 * | 1/2014 | Mukhopadhyay | H04L 41/046 709/202 |
| 8,972,405 | B1 * | 3/2015 | Chaulk | G06F 16/182 707/737 |

(Continued)

OTHER PUBLICATIONS

Bucella, SFCC, Jul. 2013, github (Year: 2013).*
Jon Skeet, How to convert enum value to int, Nov. 2011, Stock overflow (Year: 2011).*

*Primary Examiner* — John A Follansbee
*Assistant Examiner* — Fadi Haj Said
(74) *Attorney, Agent, or Firm* — Haynes and Boone, LLP (57) ABSTRACT

A Common Information Module (CIM) interoperability system includes a server device coupled to a network. A remote access controller in the server device is coupled to server component(s), and includes a CIM provider coupled via a CIM provider communication subsystem to a REpresentational State Transfer (REST)-CIM provider. The REST-CIM provider receives a REST request generated by a client device and redirected to the REST-CIM provider by the server device, and converts the REST request to CIM request. The REST-CIM provider then makes a call to the CIM provider that includes the CIM request and is based on a type of HTTP method request in the REST request. When the REST-CIM provider receives a CIM response from the CIM provider, it converts Common Manageability Programming Interface (CMPI) response data in that CIM response to JavaScript Object Notation (JSON) objects, and provides the JSON objects to the server device.

18 Claims, 5 Drawing Sheets

(56) References Cited

U.S. PATENT DOCUMENTS

| | | | | |
|---|---|---|---|---|
| 9,009,352 B1* | 4/2015 | Yee | ............... | H04L 51/066 |
| | | | | 709/246 |
| 9,432,484 B1* | 8/2016 | Xie | ............... | H04L 67/42 |
| 10,129,177 B2* | 11/2018 | Chang | ............... | H04L 47/829 |
| 10,305,758 B1* | 5/2019 | Bhide | ............... | G06F 16/2477 |
| 2007/0226232 A1* | 9/2007 | Yin | ............... | G06F 17/2264 |
| 2009/0089078 A1* | 4/2009 | Bursey | ............... | H04W 4/70 |
| | | | | 705/300 |
| 2010/0281101 A1* | 11/2010 | Kirvan | ............... | H04L 67/1002 |
| | | | | 709/203 |
| 2011/0296404 A1* | 12/2011 | Zhang | ............... | G06F 8/658 |
| | | | | 717/178 |
| 2014/0359586 A1* | 12/2014 | Payette | ............... | G06F 8/427 |
| | | | | 717/140 |
| 2017/0195275 A1* | 7/2017 | Domsch | ............... | H04L 51/24 |
| 2018/0157532 A1* | 6/2018 | Kumar | ............... | G06F 9/5027 |
| 2019/0044823 A1* | 2/2019 | Soundararajan | ............... | H04L 41/145 |
| 2019/0332451 A1* | 10/2019 | Tamjidi | ............... | G06F 9/547 |
| 2019/0334764 A1* | 10/2019 | Chor | ............... | H04L 41/0686 |

\* cited by examiner

COMMON INFORMATION MODEL INTEROPERABILITY SYSTEM

BACKGROUND

The present disclosure relates generally to information handling systems, and more particularly to providing interoperability between a Common Information Model standard provided in information handling systems and management software used with those information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, server devices, provide for their management via management standards. For example, one management standard used for managing server devices is the Web Services Management (WSMan) standard, a Distributed Management Task Force (DMTF) open standard that defines a protocol for managing the server devices (as well as other devices, applications, and web services.) The WSMan standard operates to expose the managed elements in the server device that are defined by the Common Information Model (CIM) standard, which is an open standard that defines how the managed elements are represented as a common set of objects, and the relationships between those management elements/objects, and allows consistent management of the managed elements independent of their manufacturer or provider. Another management system used for managing server devices is the REDFISH® standard, another open standard from the DMTF. The REDFISH® standard exposes the management functions for the server device using a REpresentational State Transfer (REST) architecture that defines a set of constraints and properties based on the HyperText Transfer Protocol (HTTP), and enables web services (RESTful web services) that provide interoperability between computer systems and the Internet. The RED-FISH® standard provides several benefits over the WSMan standard, but configuring server devices that have previously operated via the WSMan standard to operate via the RED-FISH® standard raises a number of issues.

For example, some server devices provided by DELL® Inc. of Round Rock, Tex., United States, and DELL EMC® of Hopkinton, Mass., United States, have previously included an integrated DELL® Remote Access Controller (iDRAC) that is configured to utilize the CIM standard to allow for management of its server device via the WSMan standard. However, it has become desirable to switch the management of such server devices to the REDFISH® standard. While the REDFISH® standard defines schemas for managing standard components in the server devices, such server devices often include proprietary components that are defined in the REDFISH® standard by Outside Equipment Manufacturer (OEM) extensions, and the iDRAC provides abstractions of the OEM data for those OEM extensions via the CIM standard that is not configured to operate with the REDFISH® standard.

Accordingly, it would be desirable to provide a CIM interoperability system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a REpresentational State Transfer (REST)-Common Information Model (CIM) provider that is configured to: receive a REST request that was generated by a client device and redirected by a server device to the REST-CIM provider; convert the REST request to CIM request; make a call through a CIM provider communication subsystem to a CIM provider, wherein the call is based on a type of HyperText Transfer Protocol (HTTP) method request in the REST request and includes the CIM request; receive a CIM response through the CIM provider communication subsystem from the CIM provider, wherein the CIM response includes Common Manageability Programming Interface (CMPI) response data; convert the CMPI response data to JavaScript Object Notation (JSON) objects; and provide the JSON objects to the server device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
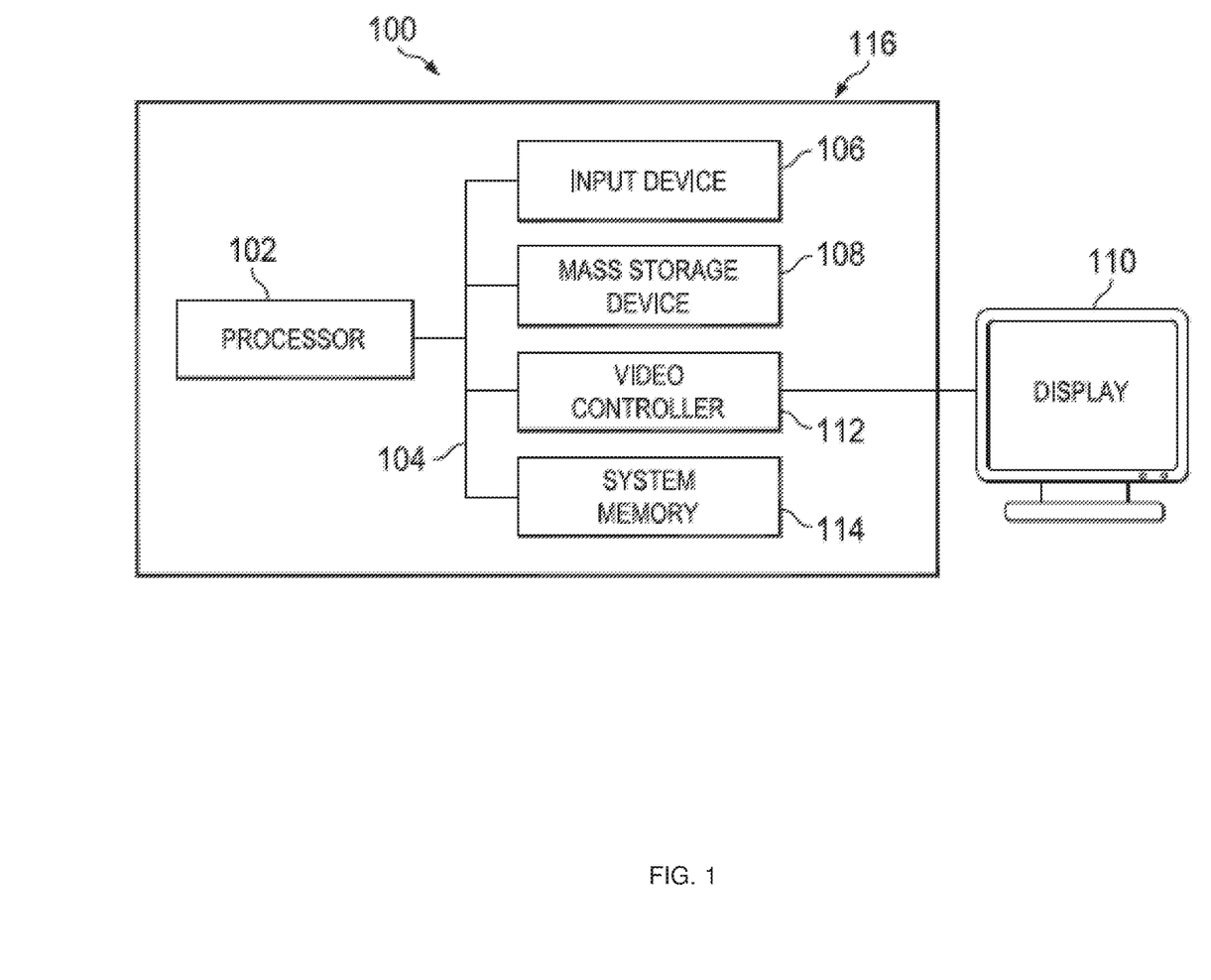
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
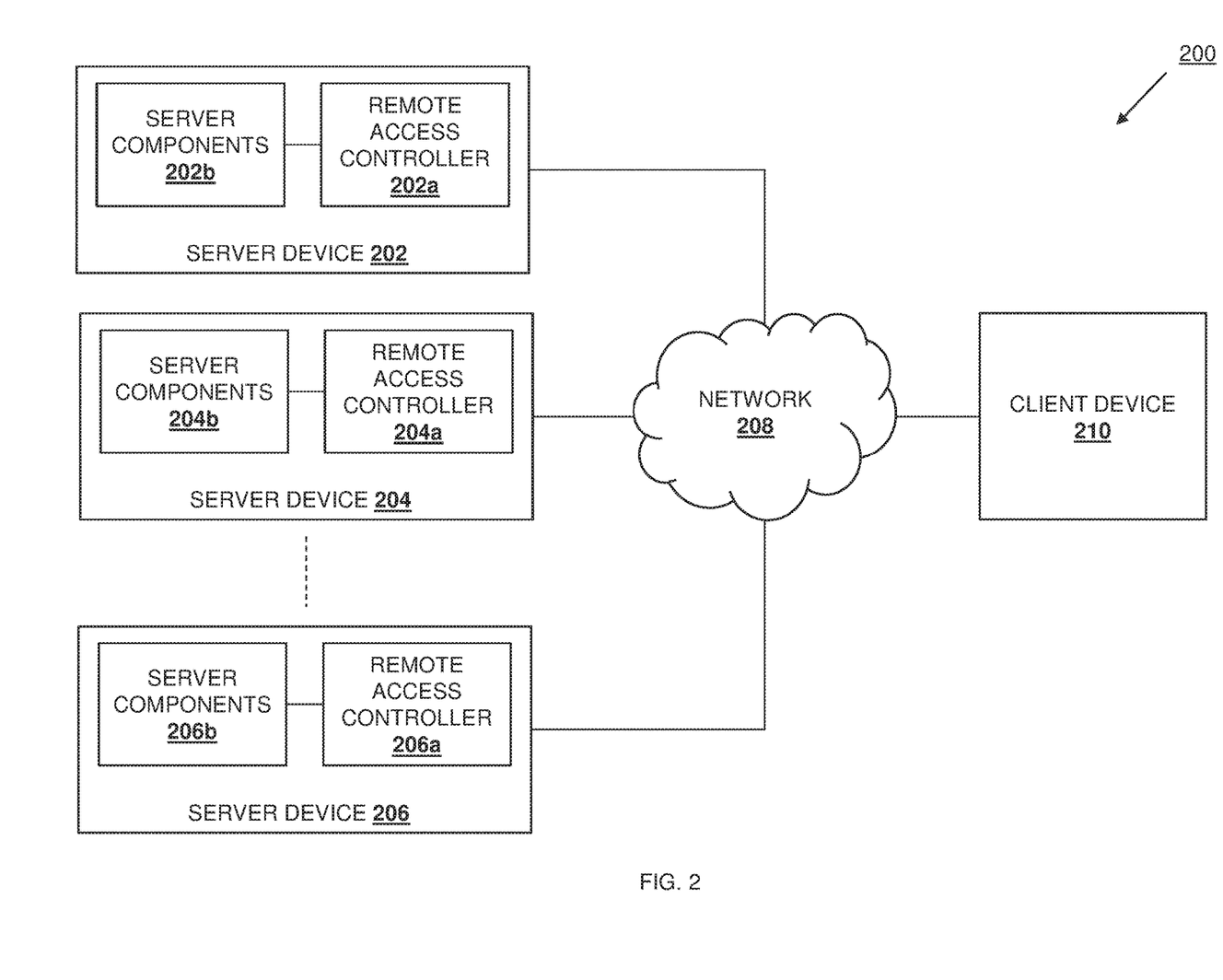
FIG. 2 is a schematic view illustrating an embodiment of server devices in a datacenter connected to a client device via a network.

Referring now to FIG. 2, an embodiment of a client/server system 200 is illustrated. In the illustrated embodiment, the client/server system 200 includes a plurality of server devices 202, 204, and up to 206, any or all of which may be provided by the IHS 100 discussed above with reference to FIG. 1, and/or which may include some or all of the components of the IHS 100. In the embodiments discussed below, each of the server devices 202, 204, and 206 includes a respective remote access controller 202a, 204a, and 206a that is coupled to respective server components 202b, 204b, and 206b in that server device. For example, the remote access controllers 202a, 204a, and 206a may be provided by an integrated DELL® Remote Access Controller (iDRAC) available from DELL® Inc. of Round Rock, Tex., United States. Furthermore, the server components 202b, 204b, and 206b may include processing systems, memory systems, storage systems, networking systems (e.g., that couple the server device 202 to the network 208), and/or any other server components that would be apparent to one of skill in the art in possession of the present disclosure.

In the embodiments discussed below, the remote access controller 202a in the server device 202 is configured to utilize the CIM standard, which conventionally allows for management of its server device 202 via the WSMan standard, and which the teachings of the present disclosure allow for the management of its server device 202 via the REDFISH® standard. In particular, the server device 202 in the examples below may include proprietary components that are defined in the REDFISH® standard by Outside Equipment Manufacturer (OEM) extensions, with the remote access controller 202a providing abstractions of the OEM data for those OEM extensions via the CIM standard that is not configured to operate with the REDFISH® standard. However, while specific server devices are illustrated in FIG. 2, one of skill in the art in possession of the present disclosure will recognize that server devices and/or other datacenter devices may include different components and/or component configurations for performing the functionality discussed below while remaining within the scope of the present disclosure as well. For example, one of skill ion the art in possession of the present disclosure will appreciate how the teachings of the present disclosure may be implemented to provide interoperability between the CIM standard and a variety of other management standards (i.e., other than the REDFISH® standard in the examples below) while remaining within the scope of the present disclosure.

Each of the server devices 202, 204, and 206 may be coupled through a network 208 to a client device 210. For example, the network 208 may be provided by a Local Area Network (LAN), the Internet, and/or a variety of other networks that would be apparent to one of skill in the art in possession of the present disclosure. In an embodiment, the client device 210 may be provided by the IHS 100 discussed above with reference to FIG. 1, and/or may include some or all of the components of the IHS 100. In the examples below, the client device 210 is configured to utilize OEM extensions in the REDFISH® standard to manage proprietary components in the server device 202. However, one of skill in the art in possession of the present disclosure will recognize that the teachings of the present disclosure may be applied to requests from client devices that utilize extensions in other management standards to manage components in the server device 202 while remaining within the scope of the present disclosure as well.

Figure 3:
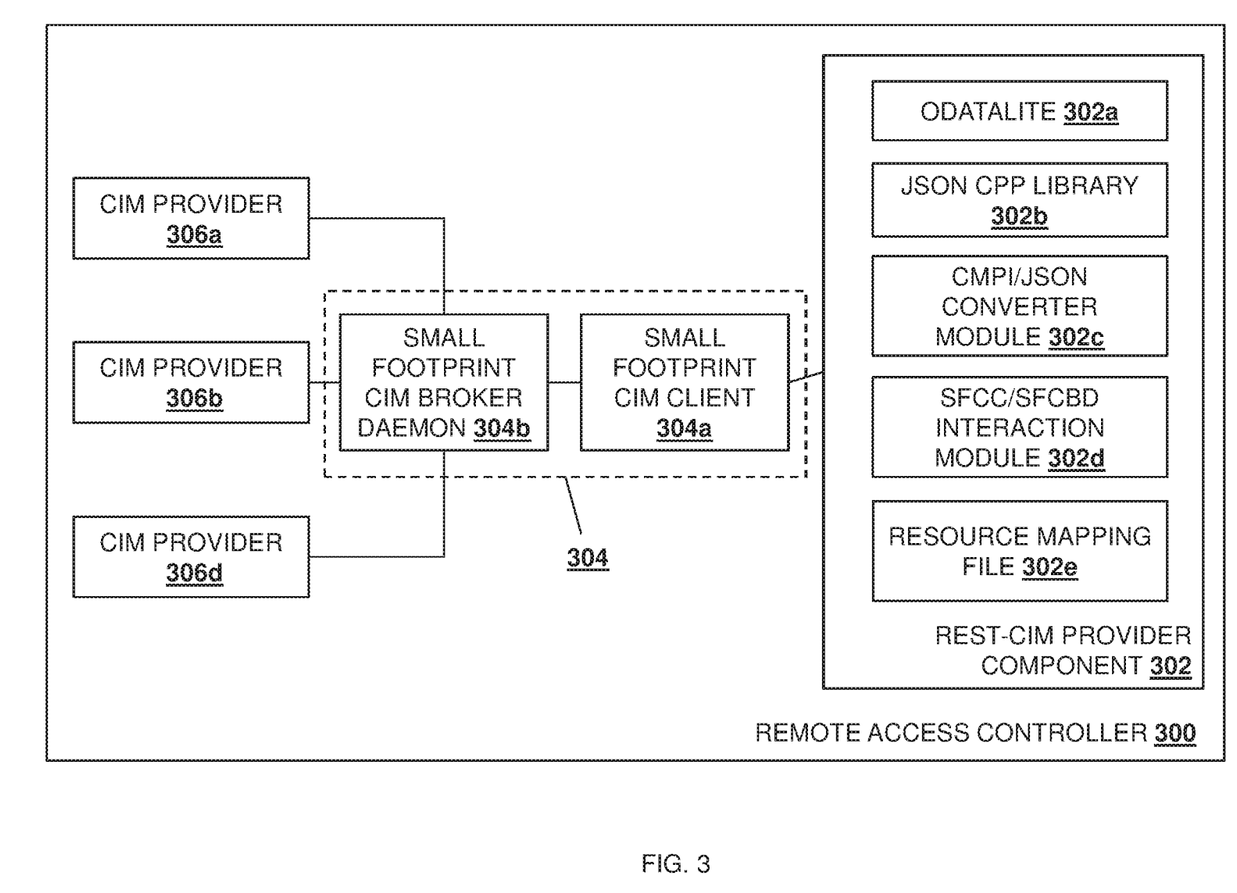
FIG. 3 is a schematic view illustrating an embodiment of a remote access controller that may be provided in the server devices of FIG. 2.

Referring now to FIG. 3, an embodiment of a remote access controller 300 is illustrated that provides the Common Information Module (CIM) interoperability system of the present disclosure, and that may provide any or all of the remote access controllers 202a, 204a, and 206a discussed above with reference to FIG. 2. As such, the remote access controller 300 may be an iDRAC available from DELL® Inc. of Round Rock, Tex., United States. However, one of skill in the art in possession of the present disclosure will recognize that some or all of the components and/or functionality of the remote access controller 300 may be provided by other components (e.g., in its server device) while remaining within the scope of the present disclosure. One of skill in the art in possession of the present disclosure will recognize that the specific example illustrated in FIG. 3 provides components for enabling interoperability between the CIM standard and the REDFISH® standard, and that modifications may be made to those components to provide interoperability between the CIM standard and other management standards while remaining within the scope of the present disclosure as well. For example, the remote access controller 300 includes a REpresentational State Transfer (REST)-CIM provider component 302 that, while not illustrated, may be coupled to one or more server components in its server device. For example, the server device 202 may be an Apache web server that implements Fast Common Gateway Interface (FASTCGI), which as discussed below may be configured to receive information via the network 208 and redetect that information to the remote access controller 202a/300.

As illustrated, the REST-CIM provider component 302 may include an open data access protocol such as ODA-TALITE® 302a (available from MICROSOFT® Corporation of Redmond, Wash., United State), which is configured to enable clients (e.g., the client device 210) to publish and manipulate resources in the server devices that are identified by Universal Resource Identifiers (URIs), and defined in the CIM standard using simple HyperText Transfer Protocol (HTTP) messages. The REST-CIM provider component 302 may also include a JavaScript Object Notation (JSON) C++ (CPP) library 302b that is configured to operate with JSON databases in the C++ programming language, and enables the parsing and saving of databases, while providing a library for accessing and manipulating data in those databases. The REST-CIM provider component 302 may also include a Common Manageability Programming Interface (CMPI)/JSON converter module 302c that is configured to perform the CMPI response data/JSON object conversions discussed below. The REST-CIM provider component 302 may also include a Small Footprint CIM Client (SFCC)/Small Footprint CIM Broker Daemon (SFCBD) interaction module 302d that provides a wrapper interface library that is configured to make calls over an SFCC and via an SFCBD to a CIM provider, as discussed below. The REST-CIM provider component 302 may also include a resource mapping file 302e that may contain supported REDFISH®-CIM OEM resources, which CIM class those resources map to, CIM properties and methods in CIM classes that are exposed as part of an OEM resource, indications of whether resources support options such as "top"/"skip"/"select", CQL queries to optimize CIM data retrieval, and/or any other information that would be apparent to one of skill in the art in possession of the present disclosure as enabling the functionality discussed below.

The remote access controller 300 also includes a CIM provider communication subsystem 304 having, in the illustrated embodiment, an SFCC 304a and an SFCBD 304b, which is coupled to CIM providers 306a, 306b, and 306c. While not illustrated, the CIM providers may be coupled to server components in the server device such as, for example, instrumentation such as a Data Manager (DM) instrumentation data store that is configured to provide a hardware abstraction to Remote Enablement (RE) and management data populators (e.g., an iDRAC hardware abstraction layer), and/or other server components that would be apparent to one of skill in the art in possession of the present disclosure. While a specific remote access controller has been illustrated and described, one of skill in the art in possession of the present disclosure will recognize that other server components may provide the functionality of the remote access controller 300, discussed below, while remaining within the scope of the present disclosure as well.

Figure 4:
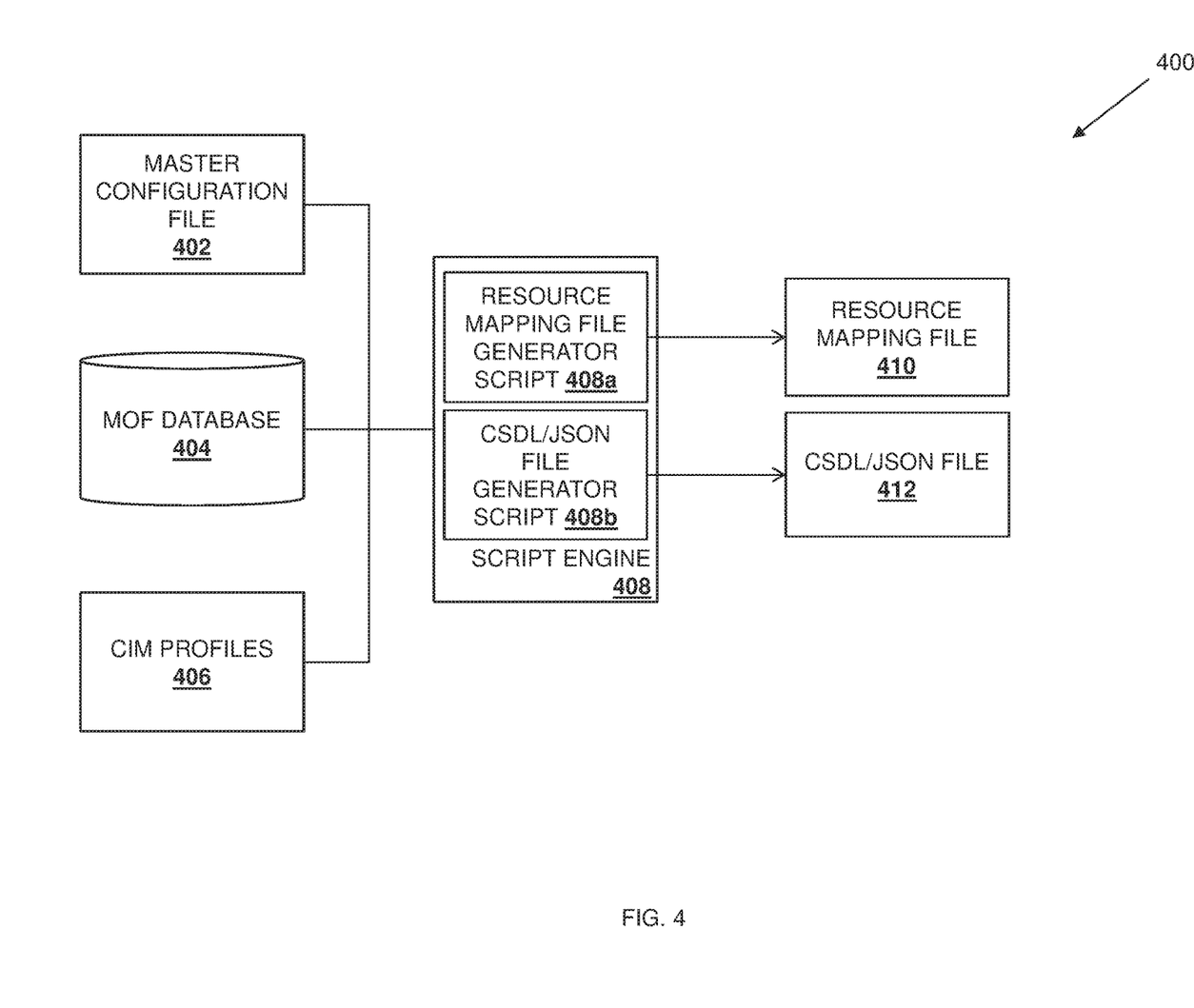
FIG. 4 is a schematic view illustrating an embodiment of a subsystem for generating a resource mapping file and a CSDL/JSON file used by the remote access controller of FIG. 3.

Referring now to FIG. 4, a subsystem 400 is illustrated that may be utilized for generating a resource mapping file and a CSDL/JSON file used by the remote access controller 300 of FIG. 3. In the embodiment below, the resource mapping file provides for the mapping of elements in the CIM standard to elements in the REDFISH® standard, although one of skill in the art in possession of the present disclosure will recognize that other mappings may be provided between the CIM standard and other management standards. For example:

CIM entities may be mapped to REDFISH® resources

CIM methods may be mapped to HTTP verbs (as defined in the REDFISH® specification (DSP0266)

HTTP headers as defined in the REDFISH® specification (e.g., the CIM standard defines a managed entity through a class with properties that describe the object and extrinsic methods to changes the properties of a device, while also defining CIM intrinsic methods that define operations on managed entities. As such, CIM EnuerateInstances and GetInstances may be mapped to an HTTP GET.)

CIM error codes may be mapped to HTTP status codes

CIM resource metadata may be mapped to support both CSDL and JSON

CIM instances may be mapped to REDFISH® resource instances

CIM instance arrays may be mapped to REDFISH® collections

CIM properties may be mapped to REDFISH® properties

CIM jobs may be mapped to REDFISH tasks

CIM intrinsic methods may be mapped to Native HTTP verbs

CIM extrinsic methods may be mapped to REDFISH® resource actions

CIM MOF files may be mapped to CSDL/JSON schema files

GET commands may be mapped to the enumeration of a single CIM instance or collection of CIM instances PATCH commands may be mapped to the modification of a partial CIM instance PUT commands may be mapped to the replacement of a CIM instance POST commands may be associated with REDFISH® actions mapped from CIM extrinsic methods DELETE commands may be mapped to the deletion of a CIM instance HEAD commands may be mapped to the derivation from a target CIM instance In the example illustrated in FIG. 4, the subsystem 400 includes a master configuration file 402 that may be provide in a JSON format and that includes properties used to generate the source mapping file and CSDL/JSON file discussed below. For example, those properties may include:

A "supports_collection" property—e.g., a Boolean value indicating if a resource supports collection A "supports_top-skip" property—e.g., a Boolean value indicating if a resource supports $skip and $stop A "supports_nextlink_property" property—e.g., a Boolean value that indicating if a nextlink property is supported A "supports_auto_expand" property—e.g., including resource details if a source supports "auto_expand"

A "supports_links_property" property—e.g., including details of an associated CIM resource if the resource supports "links_property"

A "is_standalone" property—e.g., including a mapping of the complete CIM resource if the value is true, and embedding the resource to existing an REDFISH® resource if the value is false A "white_listed_props" property—e.g., including a list of CIM class properties that need to be embedded as OEM properties in a REDFISH® resource A "white_listed_methods" property—e.g., including a list of CIM class methods that need to be embedded as OEM methods in a REDFISH® resource A "deprecated_props" property—including a list of properties to be marked as deprecated in the respective schema A "deprecated_methods" property—including a list of methods to be marked as deprecated in the respective schema A "wsman_exclusions" property—e.g., including data required to implement exclusions. This section is configured to generate data for CIM resources that are specific to REDFISH® only and should be excluded in WSMAN/WMI output (e.g., "DCIM_Class"—the name of the DCIM_Class that needs to be excluded; "DCIM_Class object"—properties and methods that need to be excluded.)

As such, one of skill in the art in possession of the present disclosure will recognize that the master configuration file 402 may include a variety of details about CIM classes that need to be supported in the REST-CIM provider component 302 and legacy REDFISH® providers.

In the example illustrated in FIG. 4, the subsystem 400 also includes a Management Object Format (MOF) database 404 that may include a Python programming language dictionary having details about CIM classes, CIM methods, CIM properties, CIM qualifiers, and/or other CIM elements that would be apparent to one of skill in the art in possession of the present disclosure. The subsystem 400 also includes CIM profiles 406 (e.g., CIMProfile.c file received from CIM providers). A script engine 408 in the subsystem 400 has access to each of the master configuration file 402, the MOF database 404, and the CIM profiles 406, and in the illustrated embodiment in includes a resource mapping file generator script 408a. In an embodiment, the resource mapping file generator script 408a is configured to retrieve supported operations and links details from the CIM profiles 406, retrieve mapped CIM data from the master configuration file 402, and retrieve metadata for CIM resources from the MOF database 404 for use in creating a resource mapping file 410 (which may be the resource mapping file 302e of FIG. 3). As such, the resource mapping file generator script 408a is configured to derive the resource mapping file 410 from the master configuration file 402 and the details about the supported operations and links in the CIM profiles 406 that provide the data of the required CIM resources, and populate the descriptive metadata for the CIM resources from the associated MOF database 404.

In a specific embodiment, the resulting resource mapping file 410 will then contain data that: maps REDFISH® resource names to CIM class names; maps REDFISH® EnumType to CIM Integer type (e.g. Value-ValueMap); identifies allowed operations that need to be populated in HTTP response headers; and provides details about the support of $select, $nextLink, and links_property. An example of a portion of a resource mapping file is provided below:

```
'SensorCollection': {
    "cim_class": "DCIM _Sensor",
    "supports_nextlinks_property": false,
    "supports_top_skip": true,
},
"Sensor": {
    "cim _class": "DCIM _Sensor",
    "supports_links_property": true,
    "supports_select": true,
    "auto_expand_references": false,
    "is_standalone": true,
    "allowed_operations": ["GET", "PATCH"},
    "properties": {
        "EnabledState": {
            "value_mapping": {
                0: "Unknown",
                1: "Other",
                2: "Enabled",
                .....
            }
        },
```

-continued

```
        "HealthState": {
            0: "Unknown",
            5: "OK",
            10: "Degraded"
        }
    }
}
```

As such, one of skill in the art in possession of the present disclosure will recognize that the resource mapping file 410 may include all the support REDFISH®-CIM OEM resources, which CIM class they map to, all CIM properties and methods of the CIM class (which will be exposed as part of the OEM resource), whether the resource supports options such as "top"/"skip"/"select", and may include a CQL query to optimize the CIM data retrieval as well.

In the illustrated embodiment, the script engine 408 also includes a CSDL/JSON file generator script 408b. In an embodiment, the CSDL/JSON file generator script 408b is configured to generate a CSDL/JSON file 412. As would be apparent to one of skill in the art in possession of the present disclosure, the REDFISH® specification defines CSDL/JSON schema files that define the representation of resources, while the CIM standard defines the class definition in an MOF database. As such, for REDFISH® mapped CIM classes, the CSDL/JSON file generator script 408b may be configured to generate CSDL/JSON files 412 from the corresponding MOF files in the MOF database 404. The mappings to convert a CIM MOF file to a REDFISH® CSDL/JSON file may include:

mapping CMPI DataTypes to EDM DataTypes mapping CIM Qualifiers to REDFISH® Annotations mapping CIM classes to REDFISH® Resources mapping CIM Extrinsic Methods to REDFISH® Actions An example of a CIM MOF file is provided below:

```
[Version ( "1.0.0" ), Description (
    "DCIM_IDRACCADVIEW is a deivationof CIM_View"
    "with iDRAC Card specific data" )]
Class DCIM_iDRACCardView " DCIM_View {
    [Description ("Property to represent Host name containing iDRAC."]
    String DNSDomainName;
    [Description ("Property to represent firmware version of iDRAC."]
    String FirmwareVersion;
    [Description ("Property to represent state of LAN."]
    ValueMap {"0", "1"},
    Values {"Disabled", "Enabled"}]
    Uint16 LANEnabledState;
    ...
};
```

Using the techniques discussed above, the CSDL/JSON file generator script 408b may utilize the CIM MOF file above to generate a CSDL file like the following example:

```
<Schemaxmlns+"http//docs.oasis-open.org/odata/ns/edm"  Namespace_"iDracCardView.
v1_0_0">
<EntityType Name="iDracCardView" BaseType="iDracCardView.iDracCardView">
    ,Annotation Term="Odata.Description" String="This is the schema definition for the
    additional OEM properties to complement DMTF Manager Schema."/>
            Annotation Term="Odata.LongDescription" String="This resource shall be used
            to represent an OEM properties for a Redfish implementation."/>
<EntityType>
<Property Name="DNSRACName" Type="Edm.String">
        <Annotation Term="OData.Permissions" EnumMember="OData.Permission/Read"/>
        <Annotation Term="OData.Description" String="Property to represent Host Name
        containing iDRAC."/>
        <Annotation Term="OData.LongDescription" String="Property to represent Host
        Name containing iDRAC."/>
</Property>
<Property Name="FirmawareVersion" Type="Edm.String">
        <Annotation Term="OData.Permissions" EnumMember="OData.Perimssion/Read"/>
        <Annotation Term="OData.Description" String="Property to represent firmware
        version of iDRAC."/>
        <Annotation Term="OData.LongDescription" String="Property to represent firmware
        version of iDRAC."/>
</Property>
<Property Name="LANEnabledState" Type="iDracCardView.v1_0_0.LANEnabledState">
        <Annotation Term="OData.Permissions" EnumMember="OData.Perimssion/Read"/>
        <Annotation Term="OData.Description" String="Property to represent state of
        LAN."/>
        <Annotation Term="OData.LongDescription" String="Property to represent state of
        LAN."/>
</Property>
<EnumType Name="LANEnabledStated">
        <Member Name_"Enabled">
                <Annotation Term="OData.Description" String="This value maps to
                Enabled"/>
        </Member>
        <Member Name_"Disabled">
                Annotation Term="OData.Description" String="This value maps to
                Disabled"/>
        </Member>
</EnumType>
.....
</Schema>
```

Figure 5:
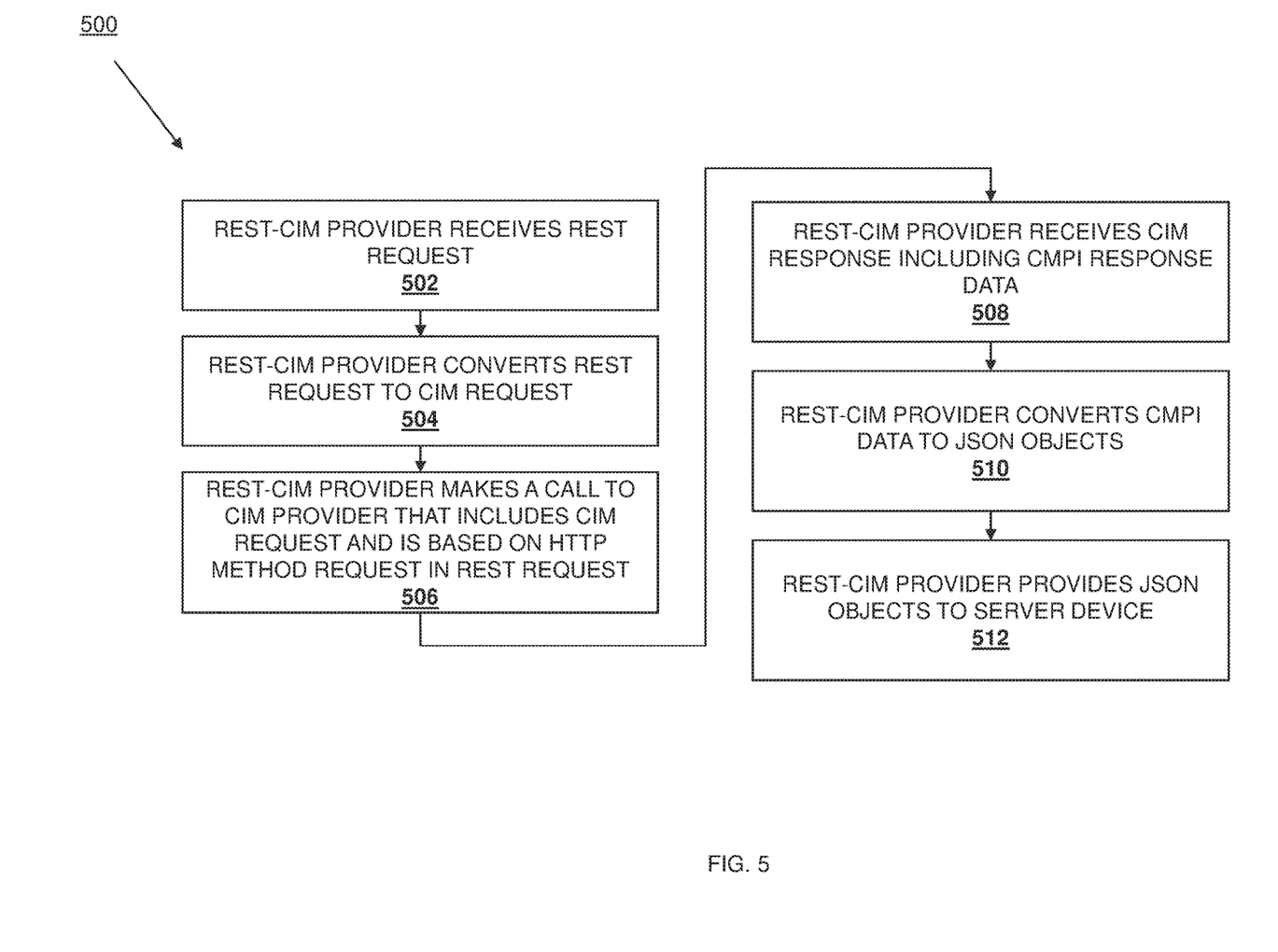
FIG. 5 is a flow chart illustrating an embodiment of a method for providing CIM interoperability.

Referring now to FIG. 5, an embodiment of a method 500 for providing CIM interoperability is illustrated. As discussed below, embodiments of the systems and methods of the present disclosure provide interoperability between elements of a CIM standard included in a remote access controller of a server device, and requests provided to that remote access controller by a client device via a REDFISH® standard. This is accomplished, in part, via a REST-CIM provider that is included in the remote access controller and that is configured to convert REST requests, which were generated by the client device and redirected to the remote the remote access controller by the server device, to CIM requests. The remote access controller may then make a call to a CIM provider in the remote access controller that includes the CIM request and is based on an HTTP method request that was included in the REST request. When the REST-CIM provider receives a CIM response back from the CIM provider, it converts CMPI response data included in the CIM response to JSON objects, and provides those JSON objects to the server device. As such, remote access controllers configured according to the CIM standard (e.g., to provide operability with the WSMan standard, as discussed above), are enabled to operate with the REDFISH® standard. While the examples provided below are specific to the REDFISH® standard, one of skill in the art will recognize that the teachings of the present disclosure may be extended and/or modified to provide interoperability between the CIM standard and other management standards as well while remaining within the scope of the present disclosure.

The method 500 begins at block 502 where a REST-CIM provider receives a REST request. In an embodiment, at block 502, the client device 210 may generate a REST request according to the REDFISH® standard, and send that REST request over the network to the server device 202. For example, the REST request received by the server device 202 at block 502 may include a Uniform Resource Identifier (URI), an HTTP Method (e.g., GET/HEAD/POST) that may be translated into the corresponding CIM request (e.g., Enumerate, Get, Invoke, etc) with the Entity name extracted from the URI and mapped to the corresponding CIM Class, and/or a variety of other REST request elements that would be apparent to one of skill in the art in possession of the present disclosure.

In an embodiment of block 502, the server device 202 may receive the REST request, determine that the REST request is directed to its remote access controller 202a and, in response, redirect that REST request to the REST-CIM provider component 302 in the remote access controller 202a/300. For example, in embodiments where the remote access controller 202a/300 is provided by an iDRAC, a Fast Common Gateway Interface (FastCGI) component in the server device 202 (e.g., which may be provided by an Apache web server as discussed above) may identify the URI in the REST request that includes a particular extension (e.g., "/redfish/v1/iDRAC/*") as being directed to the iDRAC and, in response, may direct that REST request to the iDRAC. In an embodiment, information required to route all REST requests having a particular extension may be provided by adding an entry in an "fcgi-auth.conf" file that instructs the server device 202a to perform that function. However, one of skill in the art in possession of the present disclosure will recognize that REST requests may be redirected to the REST-CIM provider in a variety of manners that will fall within the scope of the present disclosure as well. As such, at block 502, the REST-CIM provider component 302 in the remote access controller 202a/300 receives the REST request generated by the client device 210.

The method 500 then proceeds to block 504 where the REST-CIM provider converts the REST request to a CIM request. In an embodiment, at block 504, the REST-CIM provider component 302 in the remote access controller 202a/300 may operate to convert the REST request received at block 502 to a CIM request. For example, at block 504, the REST-CIM provider component 302 may access the REST request, and read header data, footer data, and/or other HTTP data that is included in the REST request. The REST-CIM provider component 302 may then pass the REST request to an ODatalite HandleRequest( ) function provided by ODatalite 302a. The ODatalite HandleRequest( ) function may operate to parse the REST request by, for example, parsing the URI and retrieve relevant details about the request such as HTTP methods and corresponding access control information). Furthermore, the REST-CIM provider component 302 may also operate to use the resource mapping file 302e to convert the REST request to a CIM request by, for example, mapping a REDFISH® resource name in the REST request to a CIM class name that is provided in the CIM request, providing any of the mappings discussed above, and/or perform other actions that one of skill in the art in possession of the present disclosure will recognize will provide for the conversion of the REST request to a CIM request for handling by the CIM providers as discussed below.

The method 500 then proceeds to block 506 where the REST-CIM provider makes a call to a CIM provider that includes a CIM request and that is based on an HTTP method request that was included in the REST request. In an embodiment, at block 506, the REST-CIM provider component 302 in the remote access controller 202a/300 may make a call via the CIM provider communication subsystem 304 to the CIM provider 306a. For example, the REST-CIM provider component 302 may utilize the SFCC/SFCBD interaction module 302d, which as discussed above may include a wrapper interface library that allows for interaction with the SFCBD 304b over the SFCC 304a, to make a call to the CIM provider 306a. As such, the call made by the REST-CIM provider component 302 at block 506 may include an SFCC call (e.g., "enumInstances( )", "InvokeMethod( )", "ModifyInstance( )", etc.) which, as discussed above, may be based on a type of HTTP method request that was included in the REST request. For example, the SFCC may communicate with SFCB to work with the CIM classes by providing the client interface to the SFCB classes (e.g., for a REST GET request, a Redfish request of /redfish/v1/Dell/Managers/iDRAC.Embedded.1/DellAggregationMetricValueCollection may translate to Enumeration of CIM class DCIM_AggregationMetricValue.

At block 506, the SFCBD 304b may receive the SFCC call made by the REST-CIM provider component 302, and may provide it to the CIM provider 306a. For example, the CIM provider may receive requests and corresponding instrumentation calls to get hardware information, which may be retrieved as a raw binary structure that is mapped to a CMPI data structure. The CIM Requests of Enumeration/Get, which retrieve the information, may correspond to the hardware structure definitions, while the CIM Request of InvokeMethod may correspond to hardware modification API calls.

The method 500 then proceeds to block 508 where the REST-CIM provider receives a CIM response including CMPI response data. In an embodiment, at block 508, the CIM provider 306a may provide a CIM response through the CIM provider communication subsystem 304 (e.g., the SFCBD 204b and the SFCC 304a) to the REST-CIM provider component 302 in the remote access controller 202a/300. For example, at block 508, the CIM provider 306a may provide a CIM response that includes CMPI response data to the REST-CIM provider component 302.

The method 500 then proceeds to block 510 where the REST-CIM provider converts the CMPI data to JSON objects. In an embodiment, at block 510, the REST-CIM provider component 302 in the remote access controller 202a/300 may operate to the use the CMPI-JSON converter module 302c to convert the CMPI data received in the CIM response to JSON objects. For example, at block 510 the REST-CIM provider component 302 may utilize the CSDL/JSON file 412 discussed above to map CMPI data included in the CMI response to JSON objects. Furthermore, the REST-CIM provider component 302 may then pass the CIM response to the ODatalite HandleRequest( ) function provided by ODatalite 302a, which may operate to parse the REST request, and respond to the HTTP request with the data received by the REST-CIM provider in a JSON format that is compliant with REDFISH®.

The method 500 then proceeds to block 512 where the REST-CIM provider provides the JSON objects to the server device. In an embodiment, at block 512, the REST-CIM provider component 302 in the remote access controller 202a/300 may then serialize the JSON objects (and other response data), and provide the serialized response data to the server device 202.

Thus, systems and methods have been described that provide interoperability between elements of a CIM standard included in a remote access controller of a server device, and requests provided to that remote access controller by a client device via a REDFISH® standard. A REST-CIM provider included in the remote access controller convert REST requests that were generated by the client device and redirected to the remote access controller by the server device, to CIM requests. The remote access controller then provides the CIMI request to a CIM provider in the remote access controller via a call that is based on an HTTP method request that was included in the REST request. When the REST-CIM provider receives a CIM response back from the CIM provider, it converts CMPI response data included in the CIM response to JSON objects, and provides those JSON objects to the server device. As such, remote access controllers configured according to the CIM standard (e.g., to provide operability with the WSMan standard, as discussed above), are enabled to operate with the REDFISH® standard, and the teachings provided herein may be modified to provide other management standards interoperability while remaining within the scope of the present disclosure.

A few specific examples of the functionality discussed above will now be described. A first example provides a "GET resources collection" REDFISH® command generated by the client device 210 to the server device 202. In response to receiving the "GET resources collection" REDFISH® command, the server device 202 may identify an extension in the "GET resources collection" URI that is directed to the remote access controller 202a and, in response, redirect the "GET resources collection" RED-FISH® command to the remote access controller 202a. The remote access controller 202a may then identify a "GET resource name" from the "GET resources collection" URI, and determine that a CIM mapping is available. The remote access controller 202a may then parse query options in the "GET resources collection" REDFISH® command to identify if options such as "top" or "skip" are present. If such options are available, the remote access controller 202a may check the resource mapping file for support (e.g., "top" support, "skip" support, etc.) and ensure that the options have valid values. In an embodiment, the conversion may be performed by the REST-CIM provider hosted as part of a webserver that is hosted on an iDRAC.

If the options are available, have support, and have valid values, or are not available, the remote access controller 202a connects to the SFCC to get a session handle. The remote access controller 202a may then make a call (e.g., "enumInstances( )" and "get enum handle") to the CIM provider and, in response, receive a CMI response. The remote access controller 202a will then read the CMPI instances in that CMPI response, apply filters for the options discussed above (e.g., "top" filters, "skip" filters, etc., if they were present), convert the CMPI instances to JSON objects, and add the JSON objects to the collection. The remote access controller 202a may then serialize the JSON objects and send them to the server device 202, following which the session with the SFCC is closed.

A second example includes a "GET resources with Selector set" REDFISH® command generated by the client device 210 and received by the server device 202. In response to receiving the "GET resources with Selector set" REDFISH® command, the server device 202 may identify an extension in the "GET resources" URI that is directed to the remote access controller 202a and, in response, redirect the "GET resources with Selector set" REDFISH® command to the remote access controller 202a. The remote access controller 202a may then parse a "classname" from the "GET resources with Selector set" URI. If the "classname" is part of a whitelist, the remote access controller 202a may extract a selector set from the "GET resources with Selector set" REDFISH® command. Similarly as discussed above, the conversion may be performed by the REST-CIM provider hosted as part of a webserver that is hosted on an iDRAC. The remote access controller 202a may then connect to the SFCC to get a session handle. The remote access controller 202a may then make a call (e.g., "getInstance( )") to the CIM provider and, in response, receive a CMI response. The remote access controller 202a will then read the CMPI instance in that CMPI response, convert the CMPI instance to JSON objects, and add the JSON objects to the collection. The remote access controller 202a may then serialize the JSON objects and send them to the server device 202, following which the session with the SFCC is closed.

A third example provides an "Invoke an Action on resource instance" REDFISH® command generated by the client device 210 to the server device 202. In response to receiving the "Invoke an Action on resource instance" REDFISH® command, the server device 202 may identify an extension in the "POST" URI that is directed to the remote access controller 202a and, in response, redirect the "Invoke an Action on resource instance" REDFISH® command to the remote access controller 202a. The remote access controller 202a may then parse a "classname" and "methodname" from the "POST" URI. If the "classname" and "methodname are part of a whitelist, the remote access controller 202a may convert the JSON payload to CMPI arguments. The remote access controller 202a may then connect to the SFCC to get a session handle. The remote access controller 202a may then make a call (e.g., "InvokeMethod( )") to the CIM provider and, in response, receive a CMI response. The remote access controller 202a will then convert the CMPI response to JSON objects, and set the response headers (if required by reference out parameters.) The remote access controller 202a may then serialize the JSON objects and send them to the server device 202, following which the session with the SFCC is closed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Common Information Module (CIM) interoperability system, comprising:
   a server device that is coupled to a network;
   at least one server component included in the server device; and
   a remote access controller that is included in the server device and coupled to the at least one server component, wherein the remote access controller includes:
   a CIM provider;
   a CIM provider communication subsystem coupled to the CIM provider; and
   a REpresentational State Transfer (REST)-CIM provider component that is configured to:
      receive a REST request that was received by the server device through the network from a client device and redirected to the REST-CIM provider component by the server device;
      convert the REST request to CIM request;
      make a call through the CIM provider communication subsystem to the CIM provider, wherein the call is based on a type of HyperText Transfer Protocol (HTTP) method request in the REST request and includes the CIM request;
      receive a CIM response through the CIM provider communication subsystem from the CIM provider, wherein the CIM response includes Common Manageability Programming Interface (CMPI) response data;
      convert, using a Common Schema Definition Language (CSDL)/JavaScript Object Notation (JSON) file that was generated from a CIM Management Object Format (MOF) file, the CMPI response data to JSON objects; and
      provide the JSON objects to the server device.

2. The system of claim 1, wherein the server device is configured to redirect the REST request based on a Universal Resource Identifier (URI) associated with the REST request.

3. The system of claim 1, wherein the REST-CIM provider component includes a resource mapping file that includes data for converting the REST request to the CIM request by mapping a resource name to a CIM class name and mapping an EnumType to a CIM Integer Type.

4. The system of claim 1, wherein the providing the JSON objects to the server device include:
   serializing the JSON objects; and
   sending the serialized JSON objects to the server device.

5. The system of claim 1, wherein the CIM provider communication subsystem includes a Small Footprint CIM Client (SFCC) and a Small Footprint CIM Broker Daemon (SFCBD).

6. The system of claim 5, wherein the REST-CIM provider includes an SFCC/SFCBD interaction module that provides a wrapper interface library that is configured to make the call over the SFCC and via the SFCBD to the CIM provider.

7. An Information Handling System (IHS), comprising:
   a processing system; and
   a memory system that is coupled to the processing system and that includes instructions that, when executed by the processing system, cause the processing system to provide a REpresentational State Transfer (REST)-Common Information Model (CIM) provider that is configured to:
      receive a REST request that was generated by a client device and redirected by a server device to the REST-CIM provider;
      convert the REST request to CIM request;
      make a call through a CIM provider communication subsystem to a CIM provider, wherein the call is based on a type of HyperText Transfer Protocol (HTTP) method request in the REST request and includes the CIM request;
      receive a CIM response through the CIM provider communication subsystem from the CIM provider, wherein the CIM response includes Common Manageability Programming Interface (CMPI) response data;
      convert, using a Common Schema Definition Language (CSDL)/JavaScript Object Notation (JSON) file that was generated from a CIM Management Object Format (MOF) file, the CMPI response data to JSON objects; and
      provide the JSON objects to the server device.

8. The IHS of claim 7, wherein the REST request is associated with a Universal Resource Identifier (URI) that causes the redirection of the REST request to the REST-CIM provider.

9. The IHS of claim 7, wherein the REST-CIM provider includes a resource mapping file that includes data for converting the REST request to the CIM request by mapping a resource name to a CIM class name and mapping an EnumType to a CIM Integer Type.

10. The IHS of claim 7, wherein the providing the JSON objects to the server device include:
    serializing the JSON objects; and
    sending the serialized JSON objects to the server device.

11. The IHS of claim 7, wherein the CIM provider communication subsystem includes a Small Footprint CIM Client (SFCC) and a Small Footprint CIM Broker Daemon (SFCBD).

12. The IHS of claim 11, wherein the REST-CIM provider includes an SFCC/SFCBD interaction module that provides a wrapper interface library that is configured to make the call over the SFCC and via the SFCBD to the CIM provider.

13. A method for providing CIM interoperability, comprising:
    receiving, by a REpresentational State Transfer (REST)-Common Information Model (CIM) provider component in a server device, a REST request that was generated by a client device and redirected by the server device to the REST-CIM provider;
    converting, by the REST/CIM provider component, the REST request to CIM request;
    making, by the REST/CIM provider component, a call through a CIM provider communication subsystem to a CIM provider, wherein the call is based on a type of HyperText Transfer Protocol (HTTP) method request in the REST request and includes the CIM request;
    receiving, by the REST/CIM provider component, a CIM response through the CIM provider communication subsystem from the CIM provider, wherein the CIM response includes Common Manageability Programming Interface (CMPI) response data;
    converting, by the REST/CIM provider component using a Common Schema Definition Language (CSDL)/JavaScript Object Notation (JSON) file that was generated from a CIM Management Object Format (MOF) file, the CMPI response data to JSON objects; and
    providing, by the REST/CIM provider component, the JSON objects to the server device.

14. The method of claim 13, wherein the REST request is associated with a Universal Resource Identifier (URI) that causes the redirection of the REST request to the REST-CIM provider component.

15. The method of claim 13, wherein the REST-CIM provider component includes a resource mapping file that includes data for converting the REST request to the CIM request by mapping a resource name to a CIM class name and mapping an EnumType to a CIM Integer Type.

16. The method of claim 13, wherein the providing the JSON objects to the server device include:
    serializing the JSON objects; and
    sending the serialized JSON objects to the server device.

17. The method of claim 13, wherein the CIM provider communication subsystem includes a Small Footprint CIM Client (SFCC) and a Small Footprint CIM Broker Daemon (SFCBD).

18. The method of claim 17, wherein the REST-CIM provider component includes an SFCC/SFCBD interaction module that provides a wrapper interface library that is configured to make the call over the SFCC and via the SFCBD to the CIM provider.

* * * * *